US009939155B2

(12) United States Patent
Pfeffer et al.

(10) Patent No.: US 9,939,155 B2
(45) Date of Patent: Apr. 10, 2018

(54) FLEXIBLE SWIRLERS

(71) Applicant: Delavan Inc, West Des Moines, IA (US)

(72) Inventors: Brett A. Pfeffer, Waukee, IA (US); Jason A. Ryon, Carlisle, IA (US)

(73) Assignee: Delavan Inc., West Des Moines, IA (US)

( * ) Notice: Subject to any disclaimer, the term of this patent is extended or adjusted under 35 U.S.C. 154(b) by 362 days.

(21) Appl. No.: 14/605,305

(22) Filed: Jan. 26, 2015

(65) Prior Publication Data

US 2016/0215982 A1    Jul. 28, 2016

(51) Int. Cl.

| F23D 11/10 | (2006.01) |
| F02C 7/22 | (2006.01) |
| F23R 3/14 | (2006.01) |
| F23R 3/28 | (2006.01) |
| F23R 3/34 | (2006.01) |
| F23D 11/38 | (2006.01) |
| F23D 14/24 | (2006.01) |
| B01F 3/04 | (2006.01) |
| B01F 5/04 | (2006.01) |
| B01F 5/00 | (2006.01) |

(52) U.S. Cl.
CPC ............ *F23R 3/14* (2013.01); *B01F 3/04829* (2013.01); *B01F 5/0401* (2013.01); *F02C 7/22* (2013.01); *F23D 11/103* (2013.01); *F23D 11/105* (2013.01); *F23D 11/107* (2013.01); *F23D 11/383* (2013.01); *F23D 14/24* (2013.01); *F23R 3/286* (2013.01); *F23R 3/34* (2013.01); *B01F 2003/04872* (2013.01); *B01F 2005/0017* (2013.01); *B01F 2005/0094* (2013.01); *B01F 2215/0086* (2013.01); *F23D 2900/14021* (2013.01); *F23D 2900/14701* (2013.01); *F23R 2900/00005* (2013.01)

(58) Field of Classification Search
CPC .... F23D 11/103; F23D 11/105; F23D 11/107; F23D 11/383; F23R 3/14; F23R 3/286; F02C 7/22

See application file for complete search history.

(56) References Cited

U.S. PATENT DOCUMENTS

| 3,904,119 A | * | 9/1975 | Watkins ................ B05B 7/0466 239/405 |
| 5,222,357 A | | 6/1993 | Eddy et al. |
| 5,251,447 A | * | 10/1993 | Joshi ........................ F23R 3/14 239/403 |
| 5,511,375 A | * | 4/1996 | Joshi ....................... F01D 9/065 239/403 |

(Continued)

OTHER PUBLICATIONS

European Search Report dated Jun. 20, 2016 from European Patent Office for Application No. EP 16152833.

*Primary Examiner* — Lorne Meade
*Assistant Examiner* — Eric Linderman
(74) *Attorney, Agent, or Firm* — Locke Lord LLP; Scott D. Wofsy; Joshua L. Jones

(57) ABSTRACT

A swirler includes a swirler body and a plurality of axial swirl vanes extending radially outward from the swirler body. At least one of the swirler body or vanes includes a spring channel defined therethrough. A fuel injector for a gas turbine engine can include an inner air swirler and/or outer air swirler as described above.

10 Claims, 5 Drawing Sheets

(56) References Cited

U.S. PATENT DOCUMENTS

| | | | | |
|---|---|---|---|---|
| 5,680,766 A * | 10/1997 | Joshi | ........................ | F23C 7/004 239/405 |
| 6,016,658 A * | 1/2000 | Willis | ........................ | F23R 3/02 239/405 |
| 6,141,967 A * | 11/2000 | Angel | ..................... | F23R 3/286 239/405 |
| 6,360,776 B1 * | 3/2002 | McCormick | ............ | F23D 14/62 137/896 |
| 7,237,730 B2 * | 7/2007 | Prociw | ................. | F23D 11/107 239/403 |
| 8,555,649 B2 | 10/2013 | Patel et al. | | |
| 8,607,569 B2 * | 12/2013 | Helmick | ................. | F23D 14/76 60/737 |
| 2002/0112480 A1 * | 8/2002 | McMillan | ................. | F23R 3/12 60/737 |
| 2003/0084667 A1 * | 5/2003 | Gerendas | ................. | F23R 3/14 60/748 |
| 2006/0236700 A1 * | 10/2006 | Saitoh | ........................ | F23R 3/14 60/737 |
| 2009/0025395 A1 * | 1/2009 | Nilsson | ................... | F23C 7/004 60/748 |
| 2009/0217669 A1 * | 9/2009 | Young | ................... | F23D 11/107 60/737 |
| 2010/0074757 A1 * | 3/2010 | Headland | ................. | F23C 7/004 416/227 R |
| 2010/0115966 A1 * | 5/2010 | Nagai | ..................... | F02C 7/222 60/800 |
| 2010/0263381 A1 * | 10/2010 | Ishizaka | ..................... | F23R 3/14 60/737 |
| 2010/0319353 A1 * | 12/2010 | Intile | ........................ | F23R 3/36 60/772 |
| 2011/0005230 A1 * | 1/2011 | Bailey | ..................... | F02C 7/22 60/738 |
| 2011/0048023 A1 * | 3/2011 | Patel | ..................... | F02C 7/222 60/748 |
| 2012/0167569 A1 * | 7/2012 | Takiguchi | ................. | F23R 3/14 60/734 |
| 2012/0305673 A1 * | 12/2012 | Matsuyama | ............ | F23R 3/343 239/533.2 |
| 2013/0133329 A1 * | 5/2013 | Wang | ..................... | F23R 3/286 60/737 |
| 2013/0164488 A1 * | 6/2013 | Wood | ................... | F04D 29/324 428/80 |
| 2013/0192243 A1 * | 8/2013 | Boespflug | ................. | F23R 3/14 60/776 |
| 2013/0283805 A1 * | 10/2013 | Zuo | ........................ | F23R 3/14 60/748 |
| 2014/0060063 A1 * | 3/2014 | Boardman | ............. | F23R 3/286 60/772 |
| 2014/0245742 A1 * | 9/2014 | Chew | ........................ | F23R 3/14 60/748 |
| 2016/0010855 A1 * | 1/2016 | Myers | ..................... | F23D 11/24 239/403 |
| 2016/0298845 A1 * | 10/2016 | Nagai | ..................... | F23R 3/14 |
| 2017/0102147 A1 * | 4/2017 | Wang | ..................... | F02C 3/04 |
| 2017/0152860 A1 * | 6/2017 | Miclea-Bleiziffer | . | F04D 29/444 |
| 2017/0226865 A1 * | 8/2017 | Kray | ........................ | F01D 5/141 |
| 2017/0260958 A1 * | 9/2017 | Narikawa | ................. | F03B 3/02 |
| 2017/0292705 A1 * | 10/2017 | Tanaka | ..................... | F23R 3/12 |
| 2017/0292706 A1 * | 10/2017 | Inoue | ..................... | F23R 3/14 |

* cited by examiner

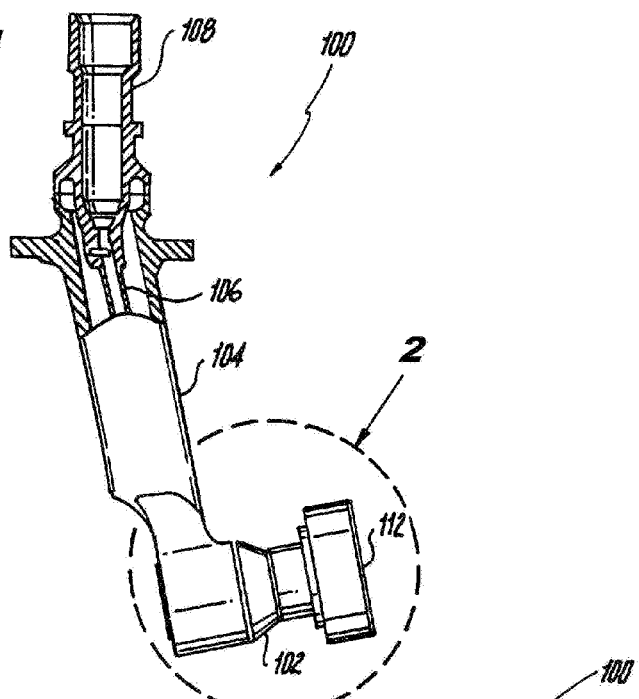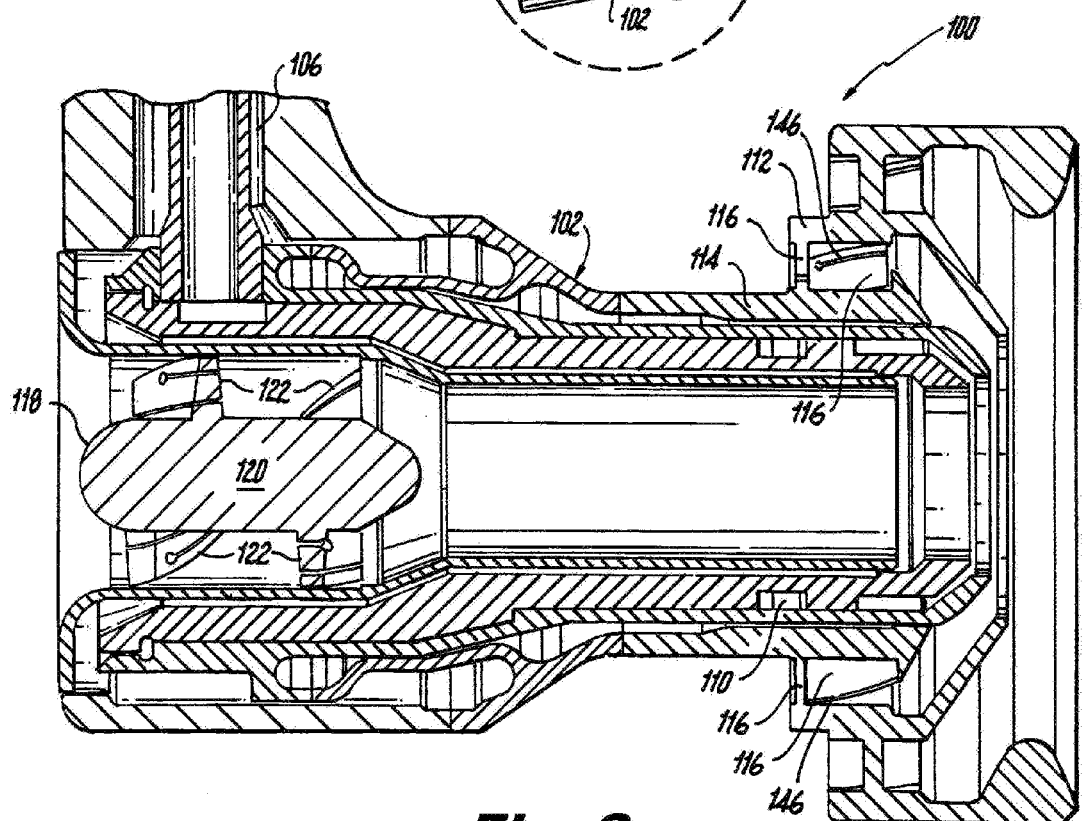

FLEXIBLE SWIRLERS

BACKGROUND OF THE INVENTION

1. Field of the Invention

The present disclosure relates to swirlers, and more particularly to air swirlers such as used in pure airblast fuel injectors for gas turbine engines.

2. Description of Related Art

A variety of devices and methods are known in the art for injecting fuel into gas turbine engines. Of such devices, many are directed to injecting fuel into combustors of gas turbine engines under high temperature conditions.

In a fuel injector for a gas turbine engine, inner air swirlers are used to impart a tangential velocity component to the air, setting up a radial pressure gradient that biases the highest velocity air towards the outer diameter of the air passage where the air meets up with the fuel. This higher velocity improves atomization of the fuel. In addition to the inner air swirlers, outer air swirlers are also present which, along with the inner air circuit, help to distribute the fuel into the combustor.

Air swirlers are subjected to hot air from the compressor, which can be at temperatures as high as 1300° F. (704° C.), and these temperatures will rise as the demand for higher compression ratios continues. Yet there are other areas of the injector in direct contact with fuel, which tends to remains much cooler than the compressor discharge air. As a consequence, the vanes in injector air swirlers act like heat exchanging fins. Due to their relatively small mass and heat fin behavior, these air swirlers tend to heat up faster than their surrounding structure. This is especially the case for transient events. Another driving mechanism for thermal stress in the outer air swirler is radiation from the flame front within the combustor. As design requirements drive toward ever hotter compressor discharge temperatures, compressor discharge air is becoming less effective at cooling outer air swirler surfaces that heat up due to flame radiation.

As current and future engines continue to increase in operating pressure ratio, the temperatures exiting from the compressor are expected to climb, while fuel temperatures are expected to remain below carbon formation temperatures. Therefore, the temperature differential to which future fuel injectors are expected to be subjected is expected to grow, leading to higher stresses and presenting limitations on the life of the injector.

Such conventional methods and systems have generally been considered satisfactory for their intended purpose. However, there is still a need in the art for improved swirlers and injectors. The present disclosure provides a solution for this need.

SUMMARY OF THE INVENTION

A swirler includes a swirler body and a plurality of axial swirl vanes extending radially outward from the swirler body. At least one of the swirler body or vanes includes a spring channel defined therethrough.

The swirler body can include an inner air swirler bullet with an opening defined in a downstream end thereof, wherein a plurality of spring channels are defined through the bullet, each extending from a point upstream of the opening and extending to the opening of the bullet. The spring channels defined through the bullet can extend helically about the bullet.

Each of the vanes can include a spring channel defined therethrough, extending from an upstream portion of the vane to a channel opening at a trailing edge of the vane. It is also contemplated that each of the vanes can include a spring channel defined therethrough, extending from a downstream portion of the vane to a channel opening at a leading edge of the vane. For example, each of the vanes can include a sigmoid spring having a first spring channel defined therethrough, extending from an upstream portion of the vane to a channel opening at a trailing edge of the vane, and a second spring channel defined therethrough radially spaced apart from the first spring channel, extending from a downstream portion of the vane to a channel opening at a leading edge of the vane.

The spring channels described herein can each have a labyrinthine cross-sectional profile to inhibit flow leakage through the spring channels. The spring channels described herein can include a stress reduction feature, e.g., one end of the spring channel can terminate at a stress reducer bore.

In accordance with certain embodiments, the swirler body includes a barrel of an outer air swirler, wherein a plurality of spring channels are defined through the barrel. The spring channels defined through the barrel can extend helically about the barrel.

A fuel injector for a gas turbine engine includes an injector body having a feed arm with a nozzle body connected thereto. A fuel conduit fluidly connects a fuel inlet portion of the feed arm to a fuel circuit in the nozzle body to form a fuel path through the injector body. An outer air swirler is operatively connected to the nozzle body outboard of the fuel circuit. The outer air swirler includes a barrel with a plurality of swirl vanes extending radially outward from the barrel. An inner air swirler is operatively connected to the nozzle body inboard of the fuel circuit. The inner air swirler includes an inner air swirler bullet with a plurality of swirl vanes extending radially outward from the bullet. At least one of the barrel, the bullet, the swirl vanes of the outer air swirler, or the swirl vanes of the inner air swirler includes a spring channel defined therethrough.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a partial cross-sectional side elevation view of an exemplary embodiment of a fuel injector constructed in accordance with the present disclosure, showing the feed arm and nozzle body;

FIG. 2 is a cross-sectional side elevation view of the nozzle body of FIG. 1, showing the inner and outer air swirlers;

DETAILED DESCRIPTION OF THE PREFERRED EMBODIMENTS

Figure 3:
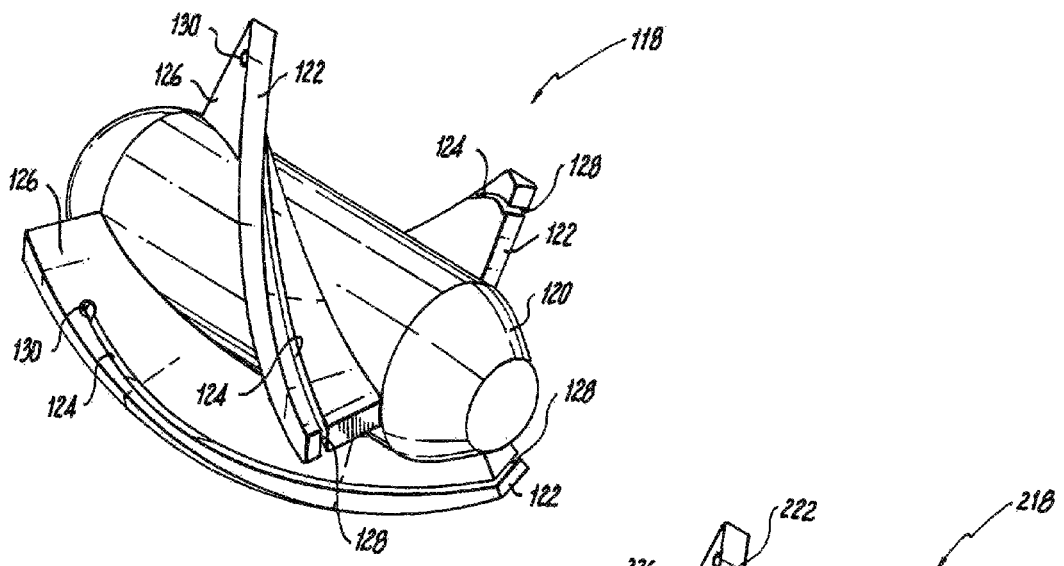
FIG. 3 is a perspective view of the inner air swirler of FIG. 2, showing the spring channels in the vanes.

Reference will now be made to the drawings wherein like reference numerals identify similar structural features or aspects of the subject disclosure. For purposes of explanation and illustration, and not limitation, a partial view of an exemplary embodiment of a fuel injector constructed in accordance with the disclosure is shown in FIG. 1 and is designated generally by reference character 100. Other embodiments of fuel injectors in accordance with this disclosure, or aspects thereof, are provided in FIGS. 2-11, as will be described. The systems and methods described herein can be used to improve mechanical flexibility and extend service life of swirlers such as used in fuel injectors for gas turbine engines.

Fuel injector 100 for a gas turbine engine includes an injector body having a feed arm 104 with a nozzle body 102 connected thereto. A fuel conduit 106 fluidly connects a fuel inlet portion 108 of feed arm 104 to a fuel circuit 110 (not shown in FIG. 1, but see FIG. 2) in nozzle body 102 to form a fuel path through the injector body. An outer air swirler 112 is operatively connected to nozzle body 102 outboard of fuel circuit 110.

With reference to FIG. 2, outer air swirler 112 includes a swirler body, namely barrel 114 with a plurality of axial swirl vanes 116 extending radially outward from barrel 114. An inner air swirler 118 is operatively connected to nozzle body 102 inboard of fuel circuit 110. Inner air swirler 118 includes a swirler body, namely inner air swirler bullet 120, with a plurality of axial swirl vanes 122 extending radially outward from bullet 120.

Referring now to FIG. 3, inner air swirler 118 is shown with the remaining portions of fuel injector 100 removed. Each of the vanes 122 includes a spring channel 124 defined therethrough. Each spring channel 124 extends from an upstream portion 126 of the respective vane 122 to a channel opening 128 at a trailing edge of the vane 122. Spring channels 124 and other embodiments thereof described herein can include a stress reduction feature, e.g., one end of the spring channel can terminate at a stress reducer bore. For example, each of spring channels 124 has a terminus in the respective vane 122 defined by a stress reducer bore 130 that has a diameter greater than the width of the channel 124. Bores 130 accommodate flexure of vanes 122 without giving rise to undue stress risers.

Figure 4:
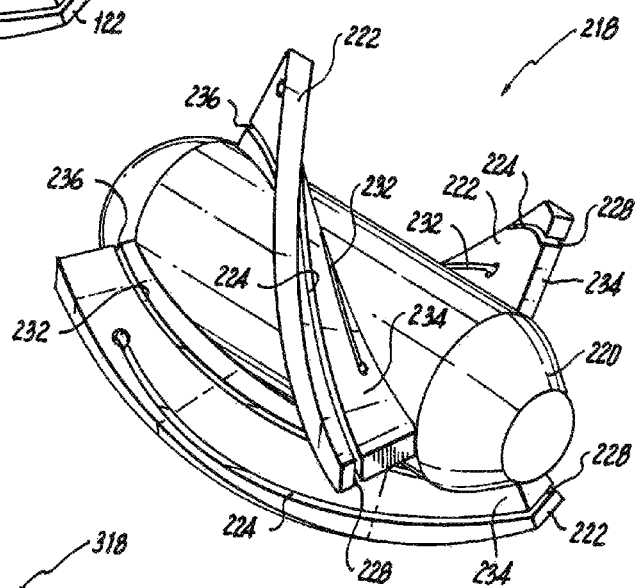
FIG. 4 is a perspective view of another exemplary embodiment of an inner air swirler, showing each vane including a sigmoid spring with two opposed spring channels.

With reference now to FIG. 4, it is also contemplated that each of the vanes can include a spring channel defined therethrough, extending from a downstream portion of the vane to a channel opening at a leading edge of the vane. For example, air swirler 218 includes a bullet 220 with radially extending vanes 222 much as described above with respect to air swirler 118. Like vanes 122 described above, each of vanes 222 includes a sigmoid spring having a first spring channel 224 defined therethrough, extending from an upstream portion 226 of the vane 222 to a channel opening 228 at a trailing edge of the vane 222. In addition, a second spring channel 232 is defined through each vane 222, radially spaced apart from the respective first spring channel 224 and extending from a downstream portion 234 of the vane 222 to a channel opening 236 at a leading edge of the vane 222. Having two or more spring channels in each vane provides additional flexibility in applications benefiting from more mechanical flexibility than is available from a single spring channel. Those skilled in the art will readily appreciate that any suitable number of spring channels can be included, and that where multiple spring channels are used, the spring channels can extend from the same edge of the vane, or different edges in any suitable combination. For example, in embodiments with two spring channels in a vane, there are four combinations of spring channel directions that can be used, depending on what is needed for a given application, including both channels extending to the trailing edge of the vane, both channels extending to the leading edge, the radially outer most channel extending to the leading edge with the radially inner channel extending to the trailing edge, and vice versa.

Figure 5:
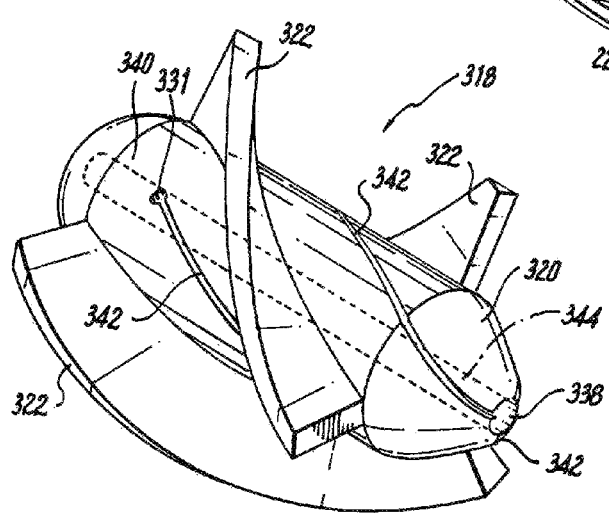
FIG. 5 is a perspective view of another exemplary embodiment of an inner air swirler, showing the bullet with spring channels defined therein.

Referring now to FIG. 5, another exemplary inner air swirler 318 is includes a flexible bullet 320. Bullet 320 has an opening 338 defined in a downstream end thereof. Opening 338 opens into an axial bore 344 defined from the downstream end of bullet 320 toward upstream portion 340 of bullet 318. Optionally, bore 344 could be defined all of the way through bullet 320 axially. A plurality of spring channels 342 are defined through bullet 318 from the exterior surface thereof, to an interior surface defined by bore 344. Each channel 342 extends from a point upstream of opening 338, e.g., in upstream portion 340, and extends downstream to opening 338. Each spring channel 342 extends helically about bullet 318, spaced circumferentially between the bases of two respective vanes 322. While no spring channels are shown in the vanes 322 of bullet 318, those skilled in the art will readily appreciate that spring channels such as shown in either of FIGS. 3 and 4 can be used in conjunction with spring channels in the bullet of an inner air swirler as shown in FIG. 5, as needed to tailor the flexibility of an inner air swirler for a given application. Spring channels 342 each include a stress reducer bore 331 as described above with respect to FIG. 3.

Figure 6:
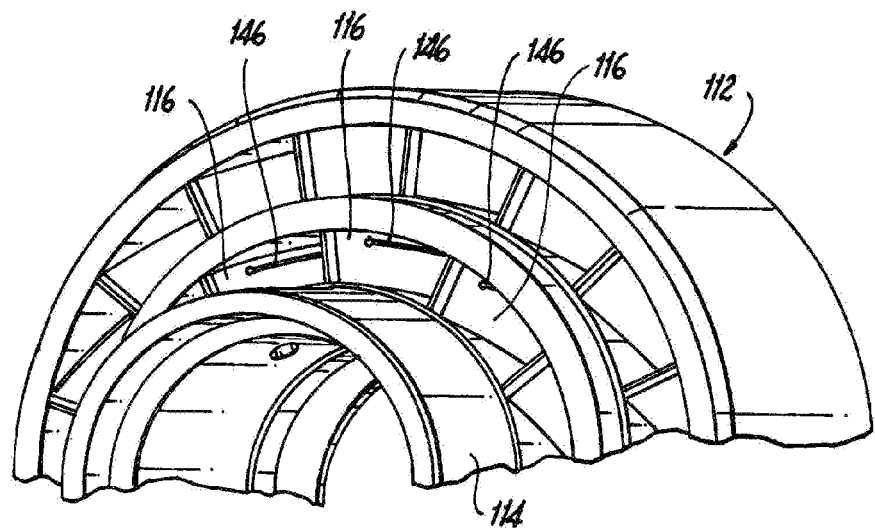
FIG. 6 is a perspective view of a portion of the outer air swirler of FIG. 2, showing the spring channels in the vanes.
Figure 7:
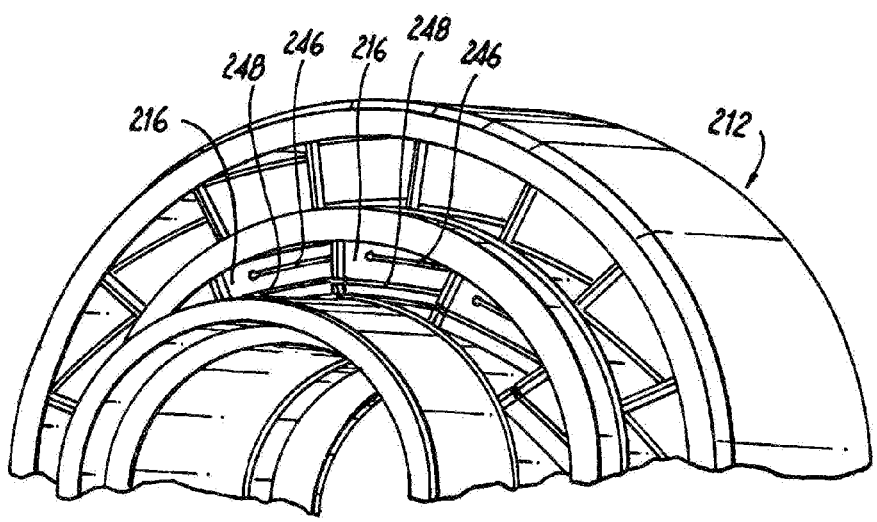
FIG. 7 is a perspective view of a portion of another exemplary embodiment of an outer air swirler, showing each vane including a sigmoid spring with two opposed spring channels.
Figure 8:
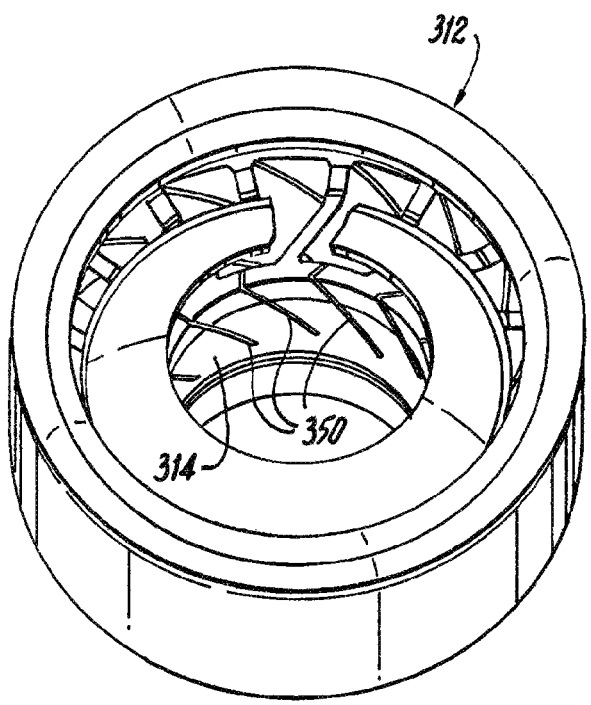
FIG. 8 is a partially cut away perspective view of a portion of another exemplary embodiment of an outer air swirler, showing the barrel with spring channels defined therein.
Figure 9:
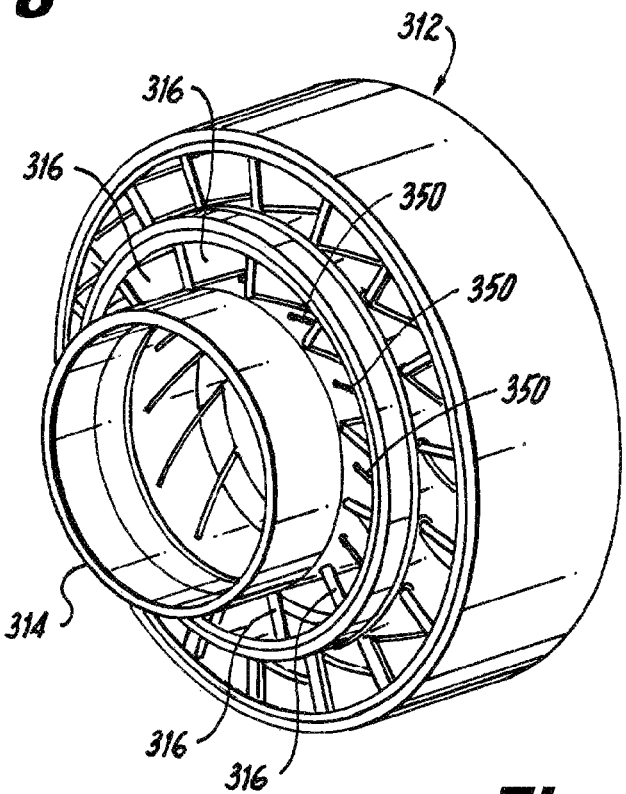
FIG. 9 is a perspective view of the outer air swirler of FIG. 8, showing the spring channels.

Referring now to FIG. 6, each of the vanes 116 extending radially from barrel 114 of outer air swirler 112 includes a spring channel 146 defined therein, similar to spring channels 124 described above with respect to FIG. 3, for providing mechanical flexibility in outer air swirler 112. As shown in FIG. 7, in another embodiment of an outer air swirler 212, each vane 216 includes a sigmoid spring with two opposed spring channels 246 and 248, much as described above with respect to FIG. 4. FIG. 8 shows another exemplary embodiment of an outer air swirler 312, wherein spring channels 350 are defined through the barrel 314. As shown in FIG. 9, spring channels 350 are similar to spring channels 342 described above with respect to FIG. 5, and wind helically around barrel 314, spaced circumferentially between vanes 316. As with the inner air swirlers described above, the features of the outer air swirlers in FIGS. 6-8 can be combined in any suitable combination as needed for a given application. Moreover, although embodiments are shown and described herein with one or two spring channels per vane, those skilled in the art will readily appreciate that any suitable number of spring channels can be used in each vane without departing from the scope of this disclosure. It should be noted that it may be desirable in applications using swirlers as shown in FIGS. 3 and 6 for the spring channels to extend to alternating edges from vane to vane, e.g., so every other vane has a spring channel extending from an upstream portion of the vane to the trailing edge of the vane, and the alternating vanes have their spring channel extending from a downstream portion of the vane to the leading edge of the vane. This can combat torsional loading from the aerodynamic loading of given applications.

Figure 10:
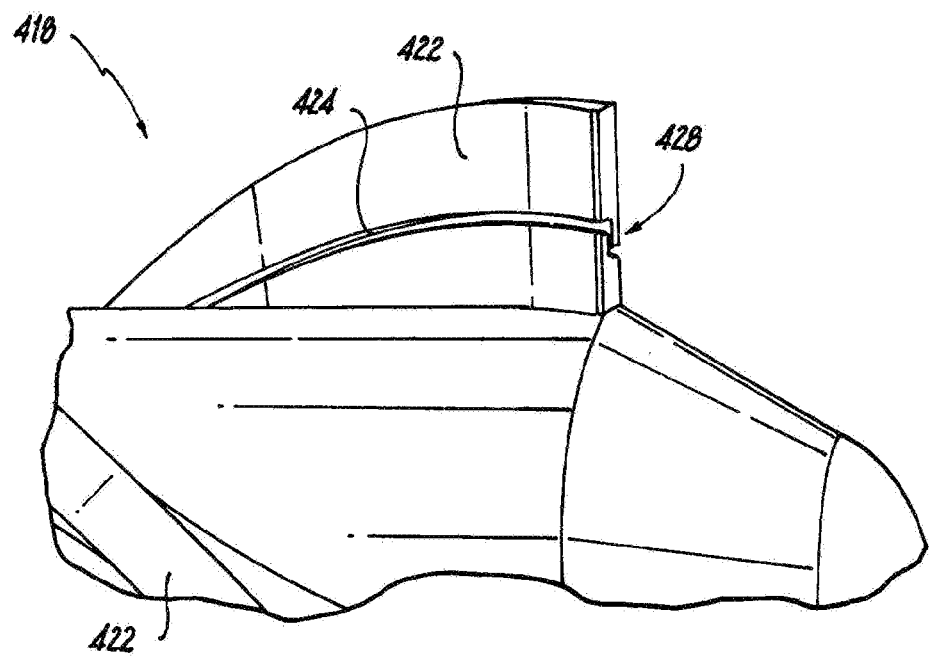
FIG. 10 is a side elevation view of a portion of another exemplary embodiment of an inner air swirler, showing a vane with a labyrinthine cross-sectional profile to reduce flow leakage through the vane.
Figure 11:
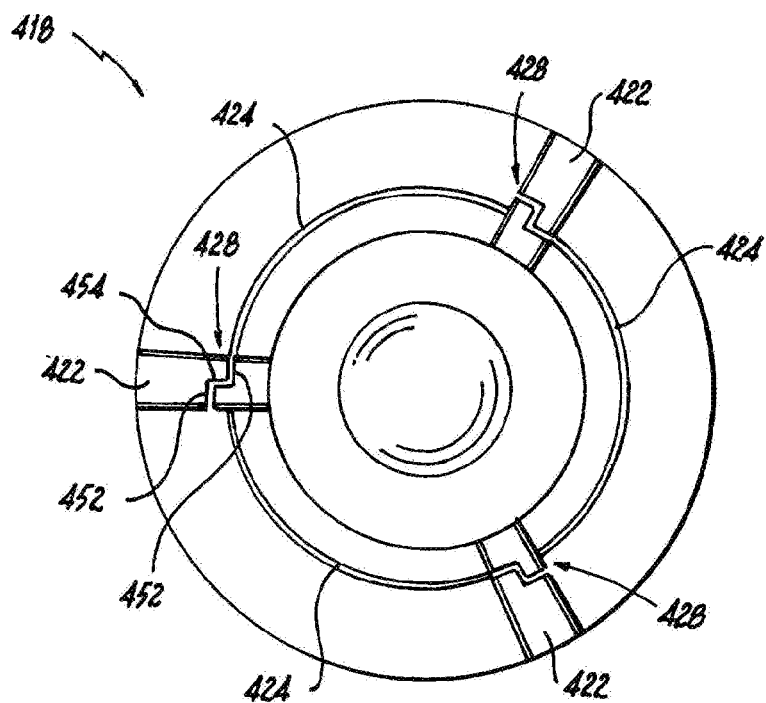
FIG. 11 is an end elevation view of the inner air swirler of FIG. 10, showing the labyrinthine cross-sectional profile of the spring channels in the vanes.

With reference to FIG. 10, a portion of another exemplary embodiment of an inner air swirler 418 with vanes 422 is described. Each vane 422 includes a spring channel 424 with a labyrinthine cross-sectional profile, which can be seen at openings 428, to inhibit flow leakage through the spring channel 424. In other words, the labyrinthine cross-sectional profile of spring channels 424 inhibits leakage of air through vanes 422, to promote the intended flow directed by vanes 422. As indicated in FIG. 11, each labyrinthine cross-sectional profile includes a pair of circumferential segments 452 connected together by a radial segment 454. This labyrinthine cross-sectional profile is exemplary only, and those skilled in the art will readily appreciate that any other suitable profile can be used without departing from the scope of this disclosure.

Any of the spring channels described herein can incorporate a straight cross-sectional profile, or any suitable labyrinthine cross-sectional profile as needed. For example, if a straight cross-sectional profile is used and leakage is unwanted in a particular application, then the channel width can be tailored so that in most conditions the channel is closed or nearly closed, e.g., the part surrounding the channel expands to close the channel width. The swirlers described herein can be produced using any suitable manufacturing techniques or combination of techniques including traditional machining and joining techniques as well as additive manufacturing techniques. Moreover, while inner and outer air swirlers are described herein with flexible components, those skilled in the art will readily appreciate that a nozzle or injector can incorporate only a flexible inner air swirler, only a flexible outer air swirler, or both, without departing from the scope of this disclosure.

The mechanical flexibility provided by the spring channels described herein allows for fuel injectors to operate in more extreme conditions than traditional injectors. For example, injectors using the techniques described herein have flexibility to withstand higher temperature gradients and more extreme thermal transient events than traditional injectors. This can be used to achieve traditional or longer than traditional injector life in conditions more extreme than appropriate for traditional injectors. Additionally or alternatively, injectors using the techniques described herein can be used in more traditional conditions with considerably longer life than traditional injectors, e.g., as retrofits. An additional benefit that the techniques described herein can provide is reduced weight relative to traditional injectors, due to the fact that the flexible structures do not need to be as large in dimension as would rigid components subjected to the same thermal conditions, and to the fact that the spring channels are voids that lightens parts relative to traditional designs without spring channels.

The methods and systems of the present disclosure, as described above and shown in the drawings, provide for swirlers with superior properties including enhanced mechanical flexibility. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A swirler comprising:
   a swirler body; and
   a plurality of axial swirl vanes extending radially outward from the swirler body, wherein at least one of the vanes includes a spring channel defined circumferentially through the thickness thereof, wherein the spring channel is located in the at least one vane extending radially outward of a base of the vane where the swirl vane connects to the swirler body, and extending radially inward of a radially outward tip of the swirl vane, wherein the spring channel is at least one of:
   the spring channel extending from an upstream portion of the vane to a channel opening at a trailing edge of the vane; and
   the spring channel extending from a downstream portion of the vane to a channel opening at a leading edge of the vane.

2. A swirler as recited in claim 1, wherein each of the vanes includes the spring channel defined therethrough, extending from an upstream portion of the vane to a channel opening at a trailing edge of the vane.

3. A swirler as recited in claim 1, wherein each of the vanes includes the spring channel defined therethrough, extending from a downstream portion of the vane to a channel opening at a leading edge of the vane.

4. A swirler as recited in claim 1, wherein the spring channel is a first spring channel, wherein each of the vanes includes a sigmoid spring including:
   the first spring channel defined therethrough, extending from an upstream portion of the vane to a channel opening at a trailing edge of the vane; and
   a second spring channel defined therethrough radially spaced apart from the first spring channel, extending from a downstream portion of the vane to a channel opening at a leading edge of the vane.

5. A swirler as recited in claim 1, wherein one end of the spring channel terminates at a stress reducer bore.

6. A swirler as recited in claim 1, wherein the swirler body includes a barrel of an outer air swirler, wherein a plurality of spring channels are defined through the barrel.

7. A swirler as recited in claim 6, wherein the spring channels defined through the barrel extend helically about the barrel.

8. A fuel injector for a gas turbine engine comprising:
   a) an injector body having a feed arm with a nozzle body connected thereto;
   b) a fuel conduit fluidly connecting a fuel inlet portion of the feed arm to a fuel circuit in the nozzle body to form a fuel path through the injector body;
   c) an outer air swirler operatively connected to the nozzle body outboard of the fuel circuit, the outer air swirler including a barrel with a plurality of swirl vanes extending radially outward from the barrel; and
   d) an inner air swirler operatively connected to the nozzle body inboard of the fuel circuit, the inner air swirler including an inner aft swirler bullet with a plurality of swirl vanes extending radially outward from the bullet, wherein at least one of the vanes of the outer air swirler, or the swirl vanes of the inner air swirler includes a spring channel defined circumferentially through the thickness thereof, wherein the spring channel is located in the at least one vane extending radially outward of a base of the vane, and extending radially inward of a radially outward tip of the swirl vane, wherein the spring channel is at least one of:

the spring channel extending from an upstream portion of the vane to a channel opening at a trailing edge of the vane; or the spring channel extending from a downstream portion of the vane to a channel opening at a leading edge of the vane.

9. A fuel injector as recited in claim 8, wherein one end of the spring channel terminates at a stress reducer bore.

10. A fuel injector as recited in claim 8, wherein the spring channel is a first spring channel, wherein each of the vanes of at least one of the inner air swirler or outer air swirler includes a sigmoid spring including:

the first spring channel defined therethrough, extending from an upstream portion of the vane to a channel opening at a trailing edge of the vane; and a second spring channel defined therethrough radially spaced apart from the first spring channel, extending from a downstream portion of the vane to a channel opening at a leading edge of the vane.

* * * * *